United States Patent
Buchler

(10) Patent No.: US 7,050,001 B2
(45) Date of Patent: May 23, 2006

(54) CARRIER SIGNAL PHASE ERROR ESTIMATION

(75) Inventor: Robert J. Buchler, Calabasas, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/082,671

(22) Filed: Mar. 17, 2005

(65) Prior Publication Data

US 2005/0206558 A1    Sep. 22, 2005

Related U.S. Application Data

(60) Provisional application No. 60/554,642, filed on Mar. 19, 2004.

(51) Int. Cl.
*G01S 5/02*    (2006.01)
*H04B 7/185*  (2006.01)

(52) U.S. Cl. .............................. 342/357.02; 342/357.12

(58) Field of Classification Search ........... 342/357.02, 342/357.06, 357.11, 357.12
See application file for complete search history.

(56) References Cited

U.S. PATENT DOCUMENTS

| 5,019,824 | A  | * | 5/1991  | Kumar ........................ 342/195 |
| 6,198,765 | B1 | * | 3/2001  | Cahn et al. .................. 375/142 |
| 6,331,835 | B1 |   | 12/2001 | Gustafson et al. |
| 6,336,061 | B1 | * | 1/2002  | Deines et al. .................. 701/13 |
| 6,516,021 | B1 | * | 2/2003  | Abbott et al. ............... 375/150 |
| 2003/0058927 | A1 |   | 3/2003  | Douglas et al. |

OTHER PUBLICATIONS

Kalman, A New Approach to Linear Filtering and Prediction Problems; Journal of Basic Engineering, Mar. 1960, pp. 35-45, vol. 82, American Society of Mechanical Engineers, NY.

* cited by examiner

*Primary Examiner*—Dao Phan
(74) *Attorney, Agent, or Firm*—Patti & Brill, LLC

(57) ABSTRACT

A phase error and/or amplitude error of a global positioning system carrier signal is estimated through employment of an optimal minimum variance of the global positioning system carrier signal.

25 Claims, 4 Drawing Sheets

CARRIER SIGNAL PHASE ERROR ESTIMATION

This application claims benefit from provisional application 60/554642 of Mar. 19, 2004.

TECHNICAL FIELD

The invention relates generally to navigation systems and more particularly to global positioning systems.

BACKGROUND

Global Positioning System ("GPS") receivers employ a plurality of GPS carrier signals to estimate a location and velocity of the receiver. The receivers process the GPS carrier signal, correlate the GPS carrier signal against an emulated carrier and code at base-band, close tracking loops, and output a final measurement for range and range rate. The processing of base-band data is not optimal. Non-linear effects, for example, large phase error, large amplitude uncertainty, and 50 Hz data bit contamination (data stripping is not assumed), must be accounted for to accurately estimate the location and velocity of the GPS receiver. In conditions of high jamming to signal ratios, determination of non-linear effects becomes difficult, which reduces accuracy of the estimated location and velocity of the receiver.

Thus, a need exists for an increase in accuracy of estimation of non-linear effects of global positioning system carrier signals.

SUMMARY

The invention in one implementation encompasses a method. A phase error and/or amplitude error of a global positioning system carrier signal is estimated through employment of an optimal minimum variance of the global positioning system carrier signal.

DESCRIPTION OF THE DRAWINGS

Features of exemplary implementations of the invention will become apparent from the description, the claims, and the accompanying drawings in which:

DETAILED DESCRIPTION

Figure 1:
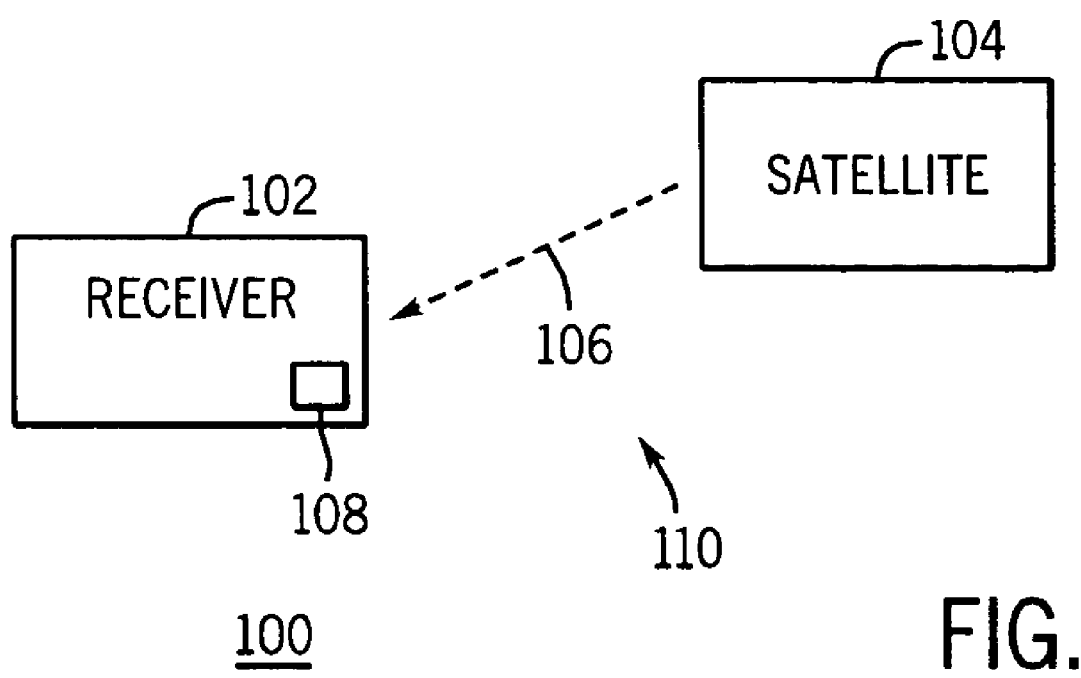
FIG. 1 is a representation of an apparatus that comprises a receiver and one or more satellites of a navigation system.

Turning to FIG. 1, an apparatus 100 in one example comprises a receiver 102 and one or more satellites 104. The receiver 102 in one example comprises a global positioning system ("GPS") receiver. In a further example, the receiver 102 comprises an L1/L2 selective availability anti-spoofing module ("SAASM") receiver. The receiver 102 in one example comprises an instance of a recordable data storage medium 108. The receiver 102 employs one or more GPS carrier signals 106 from the satellites 104 to estimate a location and/or velocity of the receiver 102. For example, the receiver 102 employs the GPS carrier signals 106 to triangulate the location of the receiver 102, as will be understood by those skilled in the art.

The satellites 104 in one example comprise space vehicles ("SVs") of a navigation system 110, for example, a global positioning system. The satellites 104 orbit the earth and provide the one or more GPS carrier signals 106 to the receiver 102. The GPS carrier signals 106 in one example comprise L1 and L2 signals, at 1575.42 megahertz and 1227.60 megahertz, respectively. Non-linear effects on the GPS carrier signals 106 reduce accuracy of the estimation of the location and/or velocity by the receiver 102. Exemplary non-linear effects are phase error and/or amplitude error caused by the GPS carrier signals 106 passing through the earth's ionosphere. The receiver 102 estimates the phase error and/or amplitude error to promote an increase in accuracy of estimation of the location and/or velocity of the receiver 102, as will be appreciated by those skilled in the art.

Using conventional early, prompt and late correlators, in-phase I and quadrature Q measurements per SV channel at 1 Khz are given by:

$$I_E = ADC(\delta r + \delta c_E)\cos(\theta) + noise_{IE}$$

$$Q_E = ADC(\delta r + \delta c_E)\sin(\theta) + noise_{QE}$$

$$I_P = ADC(\delta r)\cos(\theta) + noise_{IP}$$

$$Q_P = ADC(\delta r)\sin(\theta) + noise_{QP}$$

$$I_L = ADC(\delta r + \delta c_L)\cos(\theta) + noise_{IL}$$

$$Q_L = ADC(\delta r + \delta c_L)\sin(\theta) + noise_{QL}$$

The measurements are non-linear functions of the unknowns: Amplitude A, code error δr, carrier phase error q, data bit D. In addition, the signal may become not useful for carrier tracking if the carrier error exceeds ½ cycle (carrier slip) and invalid for code tracking if the code error exceeds a chip. To prevent loss of lock, and to obtain minimum error, it is desired to extract the optimal amount of information (signal) from the measurements.

Conventional carrier loops use a detector such as an arctan or an I*Q multiply to eliminate the unknown data bit in conditions where the data bit detection becomes unreliable (less than about 25 dBHz C/No). Both detectors work well in low noise environments. The arctan is preferred because its gain is linear with input phase up to 90 degrees. However, at higher noise levels, the arctan mean output becomes nonlinear, and loses amplitude as well, as will be understood by those skilled in the art.

Other approaches attempt to linearize the observations about an operating point. Assuming the residual errors are small, the linearization is valid, which leads to an extended Kalman filter approach. The Kalman filter would use an observation matrix H taken as the first derivative of the observations with respect to the states. To reduce the computational load, the linearized approach is mechanized in a pre-filter which consolidates 1 kHz measurements per channel over 1 second. The state estimates from the pre-filter are passed to the main Kalman Filter. There are three difficulties with the extended Kalman filter approach: The data is assumed stripped, so that the H matrix can be formed by differentiation. Secondly, the errors are assumed small so that linearization is justified. Fixups (non optimal) can be employed to try to mitigate these issues. Finally, the data must be passed to the main Kalman filter, thus introducing possible cascaded filter issues.

General Kalman filter requirements include: optimization criteria is minimum variance; all states must have a normal density function; observation must be linear function of states. The I,Q signals fail these requirements because some states are not normal (phase tends to be flat due to cycle slip, data bit is discrete two-valued) and for large errors the observations are extremely non-linear.

A general form of the optimal minimum variance solution for any system is given as:

$$\hat{x} = E\{x \mid y = Y\} = \frac{\int_{-\infty}^{\infty} X f_{x,y}(X, Y) dX}{\int_{-\infty}^{\infty} f_{x,y}(X, Y) dX}$$

where $\hat{x}$ is the minimum variance estimate of x given observation y and f(X,Y) is the joint density function of x,y. This estimator relaxes the severe Kalman restrictions, but reduces exactly to the Kalman filter if the Kalman restrictions are imposed. The penalty is that a closed form solution does not exist—the solution requires the evaluation of an integral in real time, as will be appreciated by those skilled in the art.

The general expression of the extended Kalman filter has been analytically reduced and is substantially equivalent to:

$$I_1 = b_1 \cos x + z_1 \; I_2 = b_2 \cos x + z_2 \ldots I_N = b_N \cos x + z_N$$

$$Q_1 = b_1 \sin x + y_1 \; Q_2 = b_2 \sin x + y_2 \ldots Q_N = b_N \sin x + y_N$$

where $b_i$ is a data bit, $y_i$ and $z_i$ are noise bits, and x is the phase of the carrier signal for fifty I,Q prompt observations, which would apply for 1 second assuming each observation is summed down from 1 kHz to 50 Hz (summed over a data bit assuming bit sync), as will be appreciated by those skilled in the art.

Figure 2:
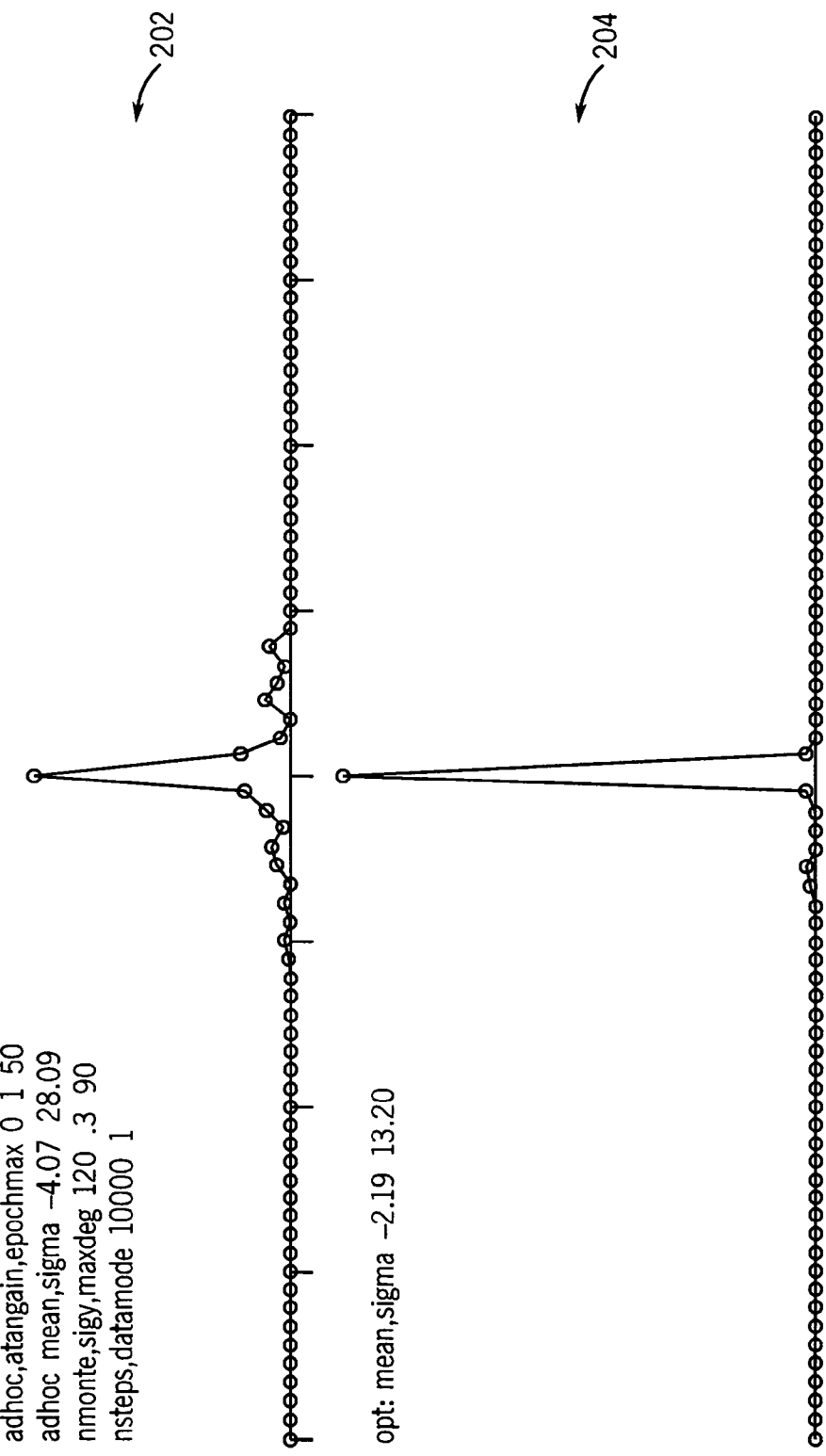
FIG. 2 is a representation of a comparison plot of an arctangent solution and an optimal solution for a phase error estimation of the apparatus of FIG. 1.

Turning to FIG. 2, plots 202 and 204 show a comparison of an arctan estimator and the optimal estimator. For low noise, the optimal minimum variance solution tracks the arctan. As the noise increases, and as the assumed statistics of the phase error increases, the optimal solution provides a better estimate. The plots 202 and 204 show the density functions of the residuals. In this case, the optimal solution sigma is smaller by a factor of two, and has smaller non-normal outliers.

A similar approach can be used to estimate the signal amplitude A. A phase estimator $\hat{x}$ and an amplitude estimator $\hat{a}$ are given by:

$$\hat{x} = \frac{\int_{-X\max}^{X\max} X f_x(X) \prod_{i=1}^{N} P_i dX}{\int_{-X\max}^{X\max} f_x(X) \prod_{i=1}^{N} P_i dX}$$

$$\hat{a} = \frac{\int_{-A\max}^{A\max} A f_a(A) \prod_{i=1}^{N} P_i dA}{\int_{-A\max}^{A\max} f_a(A) \prod_{i=1}^{N} P_i dA}$$

where $P_i$ is defined as a pair term for a pair of the $I_i$ and $Q_i$ values:

$$P_i = e^{\frac{-1}{2\sigma_y^2}[(Q_i + A \sin X)^2 + (I_i + A \cos X)^2]} + e^{\frac{-1}{2\sigma_y^2}[(Q_i - A \sin X)^2 + (I_i - A \cos X)^2]}$$

The phase estimator assumes amplitude is known and the amplitude estimator assumes phase is known. A solution (some what compromised from optimal) could be formed by looping thru both solutions.

In another example, both phase and amplitude solutions are optimal, but each requires a double integral:

$$\hat{x} = \frac{\int_{-X\max}^{X\max} X f_x(X) \left[ \int_{-A\max}^{A\max} A f_a(A) \prod_{i=1}^{N} P_i dA \right] dX}{\int_{-X\max}^{X\max} f_x(X) \left[ \int_{-A\max}^{A\max} f_a(A) \prod_{i=1}^{N} P_i dA \right] dX} \text{ and}$$

$$\hat{a} = \frac{\int_{-A\max}^{A\max} A f_a(A) \left[ \int_{-X\max}^{X\max} X f_x(X) \prod_{i=1}^{N} P_i dX \right] dA}{\int_{-A\max}^{A\max} f_a(A) \left[ \int_{-X\max}^{X\max} f_x(X) \prod_{i=1}^{N} P_i dX \right] dA}.$$

Ultra-tight implies that the main Kalman Filter and system has complete access to the I,Q measurements, and complete control of carrier and code digitally controlled oscillators of the receiver 102. The conventional internal tracking loops using the receiver's 102 chosen gains is completely eliminated. Having complete control of the tracking loops allows enhanced performance even neglecting the additional improvement from optimal usage of the I,Q data. For example, using a conventional I,Q detector, with Kalman gains weighted by C/No, improved performance is obtained.

Figure 3:
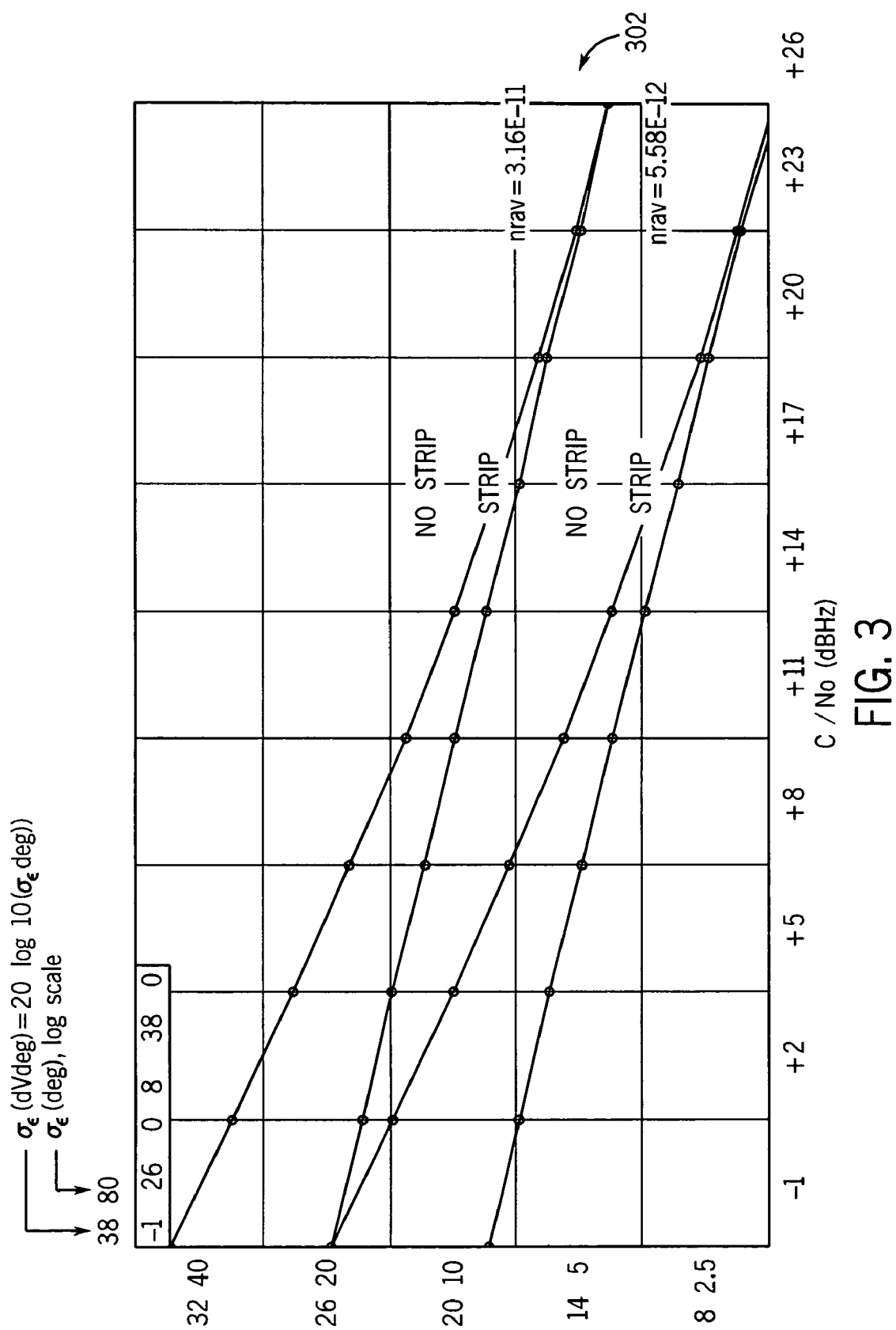
FIG. 3 is a representation of a plot that shows an optimal noise bandwidth for RF noise and receiver clock white noise for the apparatus of FIG. 1.
Figure 4:
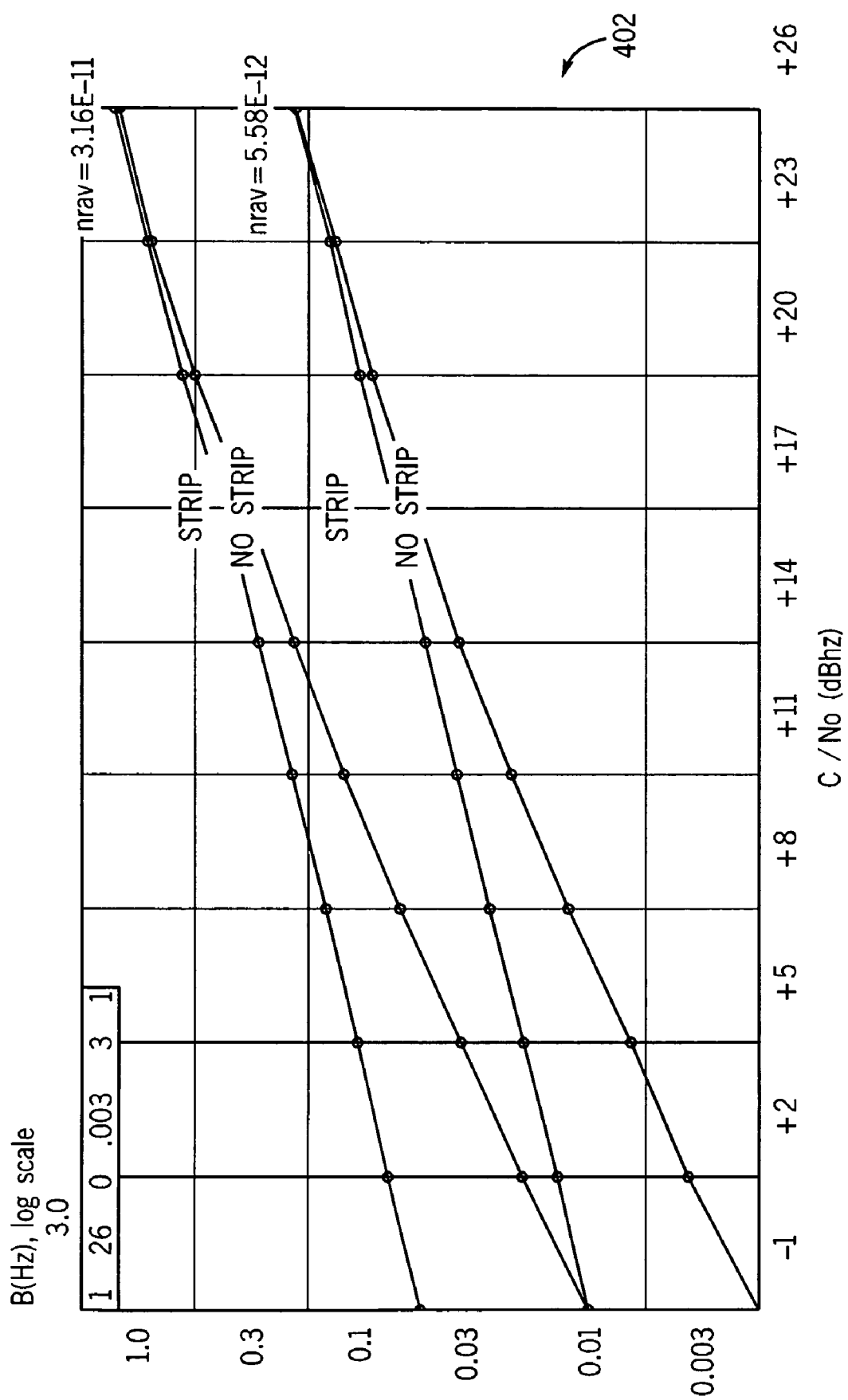
FIG. 4 is a representation of a plot that shows a phase error sigma at an optimal bandwidth for the apparatus of FIG. 1.

Turning to FIG. 3, plot 302 shows an exemplary optimal noise bandwidth (in steady-state) for noise sources RF noise (as given by C/No) shown along the x axis, and receiver clock white noise, characterized by normalized root-Allen Variance at 1 second Allen Variance separation interval shown as two parameterized conditions. In addition, each plot separates into data stripped or non-stripped performance. Clearly, with a given clock model, knowledge of a smaller C/No will allow the bandwidth to drop for minimum. Turning to FIG. 4, plot 402 shows an exemplary minimum phase error sigma at the optimal bandwidth. With enhanced processing, and using the full Kalman filter, the gain control to the tracking loops may be more finely tuned. Plots 302 and 402 also show the advantage of a lower noise receiver clock.

Other significant error sources include the clock g-sensitivity, and the inertial measurement unit ("IMU") accelerometer g-sensitivity. Both g sensitive errors can be partly mitigated by including a g-sensitive clock state and a g-sensitive accelerometer state in the main Kalman. In addition to partly estimating the errors themselves, the states provide knowledge to the Kalman to properly control the tracking loops. For example, a very large acceleration over a short time would drive off the code and phase error. Instead of reinitializing search, the Kalman would simply pick up tracking the code (assuming the error is less than a chip), and resume tracking the carrier on whatever cycle it was left with. Accelerometer g-sensitive errors may be more severe: A large acceleration over a short time may produce an I, Q transient that cannot be observed given a low C/No environment. The resulting residual IMU velocity error may cause difficulty in resuming carrier tracking. Here again, optimal processing will help recover tracking.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. Examples of a computer-readable signal-bearing medium for the apparatus 100 comprise the recordable data storage medium 108 of the receiver 102. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and those are therefore considered to be within the scope of the invention as defined in the following claims.

What is claimed is:

1. A method, comprising the steps of:
   estimating a phase error and/or amplitude error of a global positioning system (GPS) carrier signal through employment of an optimal minimum variance of the GPS carrier signal;
   generating an optimal estimate of carrier error in the presence of binary data bits having unknown states, said generating step minimizing carrier error due to an incorrect estimate of a sign of a data bit; and
   applying the optimal estimated carrier error of the GPS carrier signals to correct the corresponding phase and/or amplitude of the received GPS carrier signals.

2. The method of claim 1, wherein the step of estimating the phase error and/or amplitude error of the GPS carrier signal through employment of the optimal minimum variance solution comprises the step of:
   determining an optimal minimum variance of the GPS carrier signal through employment of a plurality of pairs of in-phase terms $I_i$ and quadrature terms $Q_i$ that are based on the GPS carrier signal; and
   wherein the generating step minimizes carrier error due to the incorrect estimate of the sign of the data bit by modeling an expected probability of 50% of receiving a +1 data bit and an expected probability of 50% of receiving a −1 data bit.

3. The method of claim 2, wherein the step of determining the optimal minimum variance of the GPS carrier signal through employment of the plurality of in-phase and quadrature terms that are based on the GPS carrier signal comprises the step of:
   calculating a plurality of pair terms $P_i$ based on the plurality of pairs of in-phase terms $I_i$ and quadrature terms $Q_i$:

$$P_i = e^{\frac{-1}{2\sigma_y^2}[(Q_i+A\sin X)^2+(I_i+A\cos X)^2]} + e^{\frac{-1}{2\sigma_y^2}[(Q_i-A\sin X)^2+(I_i-A\cos X)^2]}$$

calculating a phase error estimate $\hat{x}$ and/or an amplitude error estimate $\hat{a}$ based on the plurality of pair terms $P_i$.

4. The method of claim 3, wherein the plurality of pairs of in-phase terms and quadrature terms comprises N terms, wherein the step of calculating the phase error estimate $\hat{x}$ and/or the amplitude error estimate $\hat{a}$ based on the plurality of pair terms $P_i$ comprises the steps of:
   calculating the phase error estimate:

$$\hat{x} = \frac{\int_{-X\max}^{X\max} Xf_x(X)\prod_{i=1}^{N} P_i\, dX}{\int_{-X\max}^{X\max} f_x(X)\prod_{i=1}^{N} P_i\, dX}; \text{ and}$$

calculating the amplitude error estimate:

$$\hat{a} = \frac{\int_{-A\max}^{A\max} Af_a(A)\prod_{i=1}^{N} P_i\, dA}{\int_{-A\max}^{A\max} f_a(A)\prod_{i=1}^{N} P_i\, dA}.$$

5. The method of claim 3, wherein the plurality of pairs of in-phase terms and quadrature terms comprises N terms, wherein the step of calculating the phase error estimate $\hat{x}$ and/or the amplitude error estimate $\hat{a}$ based on the plurality of pair terms $P_i$ comprises the steps of:
   calculating the phase error estimate:

$$\hat{x} = \frac{\int_{-X\max}^{X\max} Xf_x(X)\left[\int_{-A\max}^{A\max} Af_a(A)\prod_{i=1}^{N} P_i\, dA\right] dX}{\int_{-X\max}^{X\max} f_x(X)\left[\int_{-A\max}^{A\max} f_a(A)\prod_{i=1}^{N} P_i\, dA\right] dX}; \text{ and}$$

calculating the amplitude error estimate:

$$\hat{a} = \frac{\int_{-A\max}^{A\max} Af_a(A)\left[\int_{-X\max}^{X\max} Xf_x(X)\prod_{i=1}^{N} P_i\, dX\right] dA}{\int_{-A\max}^{A\max} f_a(A)\left[\int_{-X\max}^{X\max} f_x(X)\prod_{i=1}^{N} P_i\, dX\right] dA}.$$

6. A method implemented in a global positioning system (GPS) receiver for optimizing the extraction of information from received GPS carrier signals comprising the steps of:
   receiving GPS carrier signals that are subject to non-linear effects;
   determining an optimal minimum variance of the GPS carrier signals using a Kalman filter based on a plurality of pairs of in-phase terms $I_i$ and quadrature terms $Q_i$ that represent the GPS carrier signals;
estimating a phase error and/or amplitude error of the GPS carrier signals based on the optimal minimum variance of the GPS carrier signals;
said estimating including generating an optimal estimate of carrier error in the presence of binary data bits having unknown states, said generating step minimizing carrier error due to an incorrect estimate of a sign of a data bit; and
applying the estimated phase and/or amplitude error of the GPS carrier signals to correct the corresponding phase and/or amplitude of the received GPS carrier signals.

7. The method of claim 6 further comprising the step of pre-filtering the in-phase and quadrature terms by consolidating a plurality of measurements of the in-phase and quadrature terms taken at a first sample rate into a single corresponding measurement of the in-phase and quadrature terms, the determining of the optimal minimum variance of the GPS carrier signals using a Kalman filter based on the single corresponding measurement of the in-phase and quadrature terms to reduce computational load on a processing unit of the GPS receiver.

8. The method of claim 6 wherein the step of estimating a phase error and/or amplitude error of the GPS carrier signals based on the optimal minimum variance of the GPS carrier signals generates phase and/or amplitude error estimates that provide more accurate estimates of the corresponding errors than error estimates made by using an arctan method.

9. The method of claim 8 wherein the accuracy of the phase and/or amplitude error estimates made by said estimating step as compared with the error estimates made using the arctan method increases as signal-to-noise of the received GPS carrier signals decreases.

10. The method of claim 6 further comprising the step of providing the Kalman filter with complete access to pairs of in-phase terms $I_i$ and quadrature terms $Q_i$.

11. The method of claim 6 wherein the generating step minimizes carrier error due to the incorrect estimate of the sign of the data bit by modeling an expected probability of 50% of receiving a +1 data bit and an expected probability of 50% of receiving a −1 data bit.

12. The method of claim 10 further comprising the steps of:
generating injection signals with digitally controlled oscillators that are combined with the received GPS carrier signals as part of recovery of GPS information from the GPS carrier signals; and
controlling the digitally controlled oscillators directly by the optimal minimum variance of the GPS carrier signals as determined by the Kalman filter.

13. The method of claim 6 wherein said step of determining comprises the step of:
calculating a plurality of pair terms $P_i$ based on the plurality of pairs of in-phase terms $I_i$ and quadrature terms $Q_i$:

$$P_i = e^{\frac{-1}{2\sigma_y^2}[(Q_i + A\sin X)^2 + (I_i + A\cos X)^2]} + e^{\frac{-1}{2\sigma_y^2}[(Q_i - A\sin X)^2 + (I_i - A\cos X)^2]}$$

calculating a phase error estimate $\hat{x}$ and/or an amplitude error estimate $\hat{a}$ based on the plurality of pair terms $P_i$.

14. The method of claim 13, wherein the plurality of pairs of in-phase terms and quadrature terms comprises N terms, wherein the step of calculating the phase error estimate $\hat{x}$ and/or the amplitude error estimate $\hat{a}$ based on the plurality of pair terms $P_i$ comprises the steps of:
calculating the phase error estimate:

$$\hat{x} = \frac{\int_{-X\max}^{X\max} X f_x(X) \prod_{i=1}^{N} P_i \, dX}{\int_{-X\max}^{X\max} f_x(X) \prod_{i=1}^{N} P_i \, dX} \text{; and}$$

calculating the amplitude error estimate:

$$\hat{a} = \frac{\int_{-A\max}^{A\max} A f_a(A) \prod_{i=1}^{N} P_i \, dA}{\int_{-A\max}^{A\max} f_a(A) \prod_{i=1}^{N} P_i \, dA}.$$

15. The method of claim 13 wherein the plurality of pairs of in-phase terms and quadrature terms comprises N terms, wherein the step of calculating the phase error estimate $\hat{x}$ and/or the amplitude error estimate $\hat{a}$ based on the plurality of pair terms $P_i$ comprises the steps of:
calculating the phase error estimate:

$$\hat{x} = \frac{\int_{-X\max}^{X\max} X f_x(X) \left[ \int_{-A\max}^{A\max} A f_a(A) \prod_{i=1}^{N} P_i \, dA \right] dX}{\int_{-X\max}^{X\max} f_x(X) \left[ \int_{-A\max}^{A\max} f_a(A) \prod_{i=1}^{N} P_i \, dA \right] dX} \text{; and}$$

calculating the amplitude error estimate:

$$\hat{a} = \frac{\int_{-A\max}^{A\max} A f_a(A) \left[ \int_{-X\max}^{X\max} X f_x(X) \prod_{i=1}^{N} P_i \, dX \right] dA}{\int_{-A\max}^{A\max} f_a(A) \left[ \int_{-X\max}^{X\max} f_x(X) \prod_{i=1}^{N} P_i \, dX \right] dA}.$$

16. A global positioning system (GPS) receiver for optimizing the extraction of information from received GPS carrier signals comprising:
means for receiving GPS carrier signals that are subject to non-linear effects;
means, coupled to the receiving means, for determining an optimal minimum variance of the received GPS carrier signals using a Kalman filter based on a plurality of pairs of in-phase terms $I_i$ and quadrature terms $Q_i$ that represent the GPS carrier signals;
means, coupled to the determining means, for estimating a phase error and/or amplitude error of the GPS carrier signals based on the optimal minimum variance of the GPS carrier signals, said estimating means generating an optimal estimate of carrier error in the presence of binary data bits having unknown states to minimize carrier error due to an incorrect estimate of a sign of a data bit; and
means, coupled to the estimating means, for applying the estimated phase and/or amplitude error of the GPS carrier signals to correct the corresponding phase and/or amplitude of the received GPS carrier signals.

17. The receiver of claim 16 further comprising means for pre-filtering the in-phase and quadrature terms by consolidating a plurality of measurements of the in-phase and quadrature terms taken at a first sample rate into a single corresponding measurement of the in-phase and quadrature terms, the determining means determining of the optimal minimum variance of the GPS carrier signals using a Kalman filter based on the single corresponding measurement of the in-phase and quadrature terms to reduce computational load on a processing unit of the GPS receiver.

18. The receiver of claim 16 wherein the estimating means estimates a phase error and/or amplitude error of the GPS carrier signals based on the optimal minimum variance of the GPS carrier signals generates phase and/or amplitude error estimates that provide more accurate estimates of the corresponding errors than error estimates made by using an arctan method.

19. The receiver of claim 18 wherein the estimating means provides an accuracy of the phase and/or amplitude error estimates that increases as signal-to-noise of the received GPS carrier signals decreases as compared with an error estimate made using the arctan method.

20. The receiver of claim 16 wherein the determining means provides the Kalman filter with complete access to pairs of in-phase terms $I_i$ and quadrature terms $Q_i$.

21. The receiver of claim 16 wherein the estimating means minimizes carrier error due to the incorrect estimate of the sign of the data bit by modeling an expected probability of 50% of receiving a +1 data bit and an expected probability of 50% of receiving a −1 data bit.

22. The receiver of claim 20 further comprising:
means for generating injection signals with digitally controlled oscillators that are combined with the received GPS carrier signals as part of recovery of GPS information from the GPS carrier signals; and
means for controlling the digitally controlled oscillators directly by the optimal minimum variance of the GPS carrier signals as determined by the Kalman filter.

23. The receiver of claim 16 wherein said determining means comprises:
means for calculating a plurality of pair terms $P_i$ based on the plurality of pairs of in-phase terms $I_i$ and quadrature terms $Q_i$:

$$P_i = e^{\frac{-1}{2\sigma_y^2}[(Q_i+A \sin X)^2+(I_i+A \cos X)^2]} + e^{\frac{-1}{2\sigma_y^2}[(Q_i-A \sin x)^2+(I_i-A \cos X)^2]}$$

means for calculating a phase error estimate $\hat{x}$ and/or an amplitude error estimate $\hat{a}$ based on the plurality of pair terms $P_i$.

24. The receiver of claim 23, wherein the plurality of pairs of in-phase terms and quadrature terms comprises N terms, wherein the calculating means calculates the phase error estimate $\hat{x}$ and/or the amplitude error estimate $\hat{a}$ based on the plurality of pair terms $P_i$ comprises:
means for calculating the phase error estimate:

$$\hat{x} = \frac{\int_{-X\ max}^{X\ max} X f_x(X) \prod_{i=1}^{N} P_i\, dX}{\int_{-X\ max}^{X\ max} f_x(X) \prod_{i=1}^{N} P_i\, dX}; \text{ and}$$

means for calculating the amplitude error estimate:

$$\hat{a} = \frac{\int_{-A\ max}^{A\ max} A f_a(A) \prod_{i=1}^{N} P_i\, dA}{\int_{-A\ max}^{A\ max} f_a(A) \prod_{i=1}^{N} P_i\, dA}.$$

25. The receiver of claim 23 wherein the plurality of pairs of in-phase terms and quadrature terms comprises N terms, wherein the calculating means calculates the phase error estimate $\hat{x}$ and/or the amplitude error estimate $\hat{a}$ based on the plurality of pair terms $P_i$ comprises:
means for calculating the phase error estimate:

$$\hat{x} = \frac{\int_{-X\ max}^{X\ max} X f_x(X) \left[\int_{-A\ max}^{A\ max} A f_a(A) \prod_{i=1}^{N} P_i\, dA\right] dX}{\int_{-X\ max}^{X\ max} f_x(X) \left[\int_{-A\ max}^{A\ max} f_a(A) \prod_{i=1}^{N} P_i\, dA\right] dX}; \text{ and}$$

means for calculating the amplitude error estimate:

$$\hat{a} = \frac{\int_{-A\ max}^{A\ max} A f_a(A) \left[\int_{-X\ max}^{X\ max} X f_x(X) \prod_{i=1}^{N} P_i\, dX\right] dA}{\int_{-A\ max}^{A\ max} f_a(A) \left[\int_{-X\ max}^{X\ max} f_x(X) \prod_{i=1}^{N} P_i\, dX\right] dA}.$$

* * * * *